United States Patent [19]

Koseki

[11] Patent Number: 4,823,355
[45] Date of Patent: Apr. 18, 1989

[54] HIGH SPEED AXIAL FLOW GAS LASER GENERATOR

[75] Inventor: Ryoji Koseki, La Habra, Calif.

[73] Assignee: Amada Engineering & Service Co., Inc., La Mirada, Calif.

[21] Appl. No.: 24,032

[22] Filed: Mar. 10, 1987

[51] Int. Cl.$^4$ ............................................. H01S 3/03
[52] U.S. Cl. ..................................... 372/58; 372/61; 372/87; 372/701
[58] Field of Search ..................... 372/58, 61, 87, 701

[56] References Cited

U.S. PATENT DOCUMENTS

| | | | |
|---|---|---|---|
| 3,646,475 | 2/1972 | Taylor | 372/58 |
| 4,242,646 | 12/1980 | Macken | 372/58 |
| 4,242,647 | 12/1980 | Macken | 372/58 |
| 4,356,565 | 10/1982 | Shen | 372/61 |
| 4,500,998 | 2/1985 | Kuwabara et al. | 372/58 |
| 4,612,646 | 9/1986 | Zerr | 372/58 |

FOREIGN PATENT DOCUMENTS

| | | | |
|---|---|---|---|
| 0085881 | 5/1986 | Japan | 372/58 |
| 0174785 | 8/1986 | Japan | 372/58 |

Primary Examiner—William L. Sikes
Assistant Examiner—Xuan Thi Vo
Attorney, Agent, or Firm—Wigman & Cohen

[57] ABSTRACT

A high-speed axial-flow gas laser generator has a plurality of anodes radially provided at the inlet section of the laser tube, and a ring-shaped cathode is provided on the gas discharge section side of the laser tube. On the upstream side from the anodes, viewed from the laser gas flow in the laser tube, a nozzle is provided which imparts a spiral rotary motion to the gas flow in the laser tube.

8 Claims, 3 Drawing Sheets

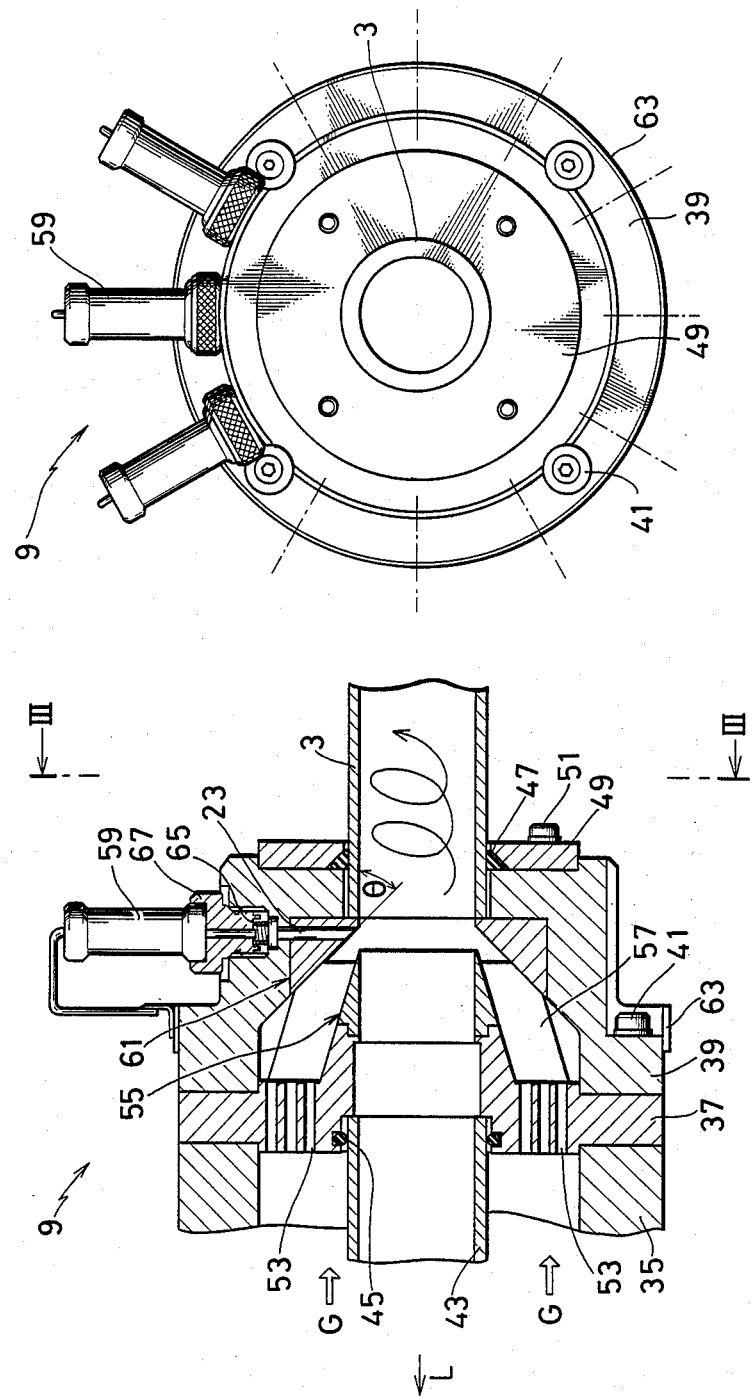

HIGH SPEED AXIAL FLOW GAS LASER GENERATOR

BACKGROUND OF THE INVENTION

1. Field of the Invention

The percent invention relates to a high-speed axial-flow gas laser generator, and, specifically, to a high-speed axial-flow gas laser generator provided with a nozzle which imparts a spiral rotary motion to the gas flow in the laser tube.

2. Description of the Related Art

As high-speed axial-flow gas laser generators, there are the transverse inflow type which employs a system wherein the laser gas flows into the laser tube in a transverse direction relative to the laser tube, and the inclined inflow type wherein the laser gas flows into the laser tube at a predetermined angle relative to the laser tube.

Generally, in the transverse inflow type a ceramic nozzle is mounted at right angles to the laser tube in the laser gas inflow section of the laser tube, and an anode pin is provided in the interior of this ceramic nozzle. A ring-shaped cathode is mounted in the laser gas discharge section of the laser tube. A high voltage power source is connected between the cathode and the anode pin.

In the inclined inflow type of high-speed axial-flow laser gas generator, a ring shaped anode and a ceramic nozzle are generally mounted on the laser gas inflow side of the laser tube at a predetermined distance with an inclined slot therebetween. A ring-shaped cathode is mounted on the laser gas discharge side of the laser tube. A high voltage power source is connected between the cathode and the anode.

In the transverse inflow type of high-speed axial-flow laser gas generator, because the laser gas is bent at a right angle when it flows into the laser tube an undulation phenomenon is produced close to the laser gas inflow section of the laser tube. This causes the upstream gas flow to become unstable so that the plasma generated by the electric discharge is also unstable. In addition, in the area close to the downstream cathode the laser gas is expanding and is flowing at a high speed, so that the Reynolds number of the laser gas is in the turbulent flow area and turbulent flow occurs. This turbulent flow acts to break up a turbulent flow of larger scale which appears locally uniform within the laser tube. Accordingly, because the laser gas flow fluctuates from the lack of turbulent flow of larger scale in the laser gas, the generation of plasma is unstable. This fact becomes strikingly obvious when the discharge current increases.

In addition, in the inclined inflow type of high-speed axial-flow laser gas generator, because the anode is ring-shaped, the discharge spot moves on a ring, or grows, and a uniform electric discharge is difficult to obtain. In addition, in the same way as in the previous example, because the gas flow close to the downstream cathode fluctuates, the plasma generation is unstable. This becomes strikingly obvious when the electric discharge current increases.

SUMMARY OF THE INVENTION

An object of the present invention is to provide, with due consideration to the drawbacks of such conventional devices, a high-speed axial-flow gas laser generator wherein stable plasma is produced over the entire area within the laser tube.

In order to accomplish these objects, in the high-speed axial-flow gas laser generator of the present invention a plurality of anodes are radially provided at the inlet section side of the laser tube, and a ring-shaped cathode is provided on the gas discharge section side of the laser tube. On the upstream side from the anodes, viewed from the laser gas flow in the laser tube, a nozzle is provided which imparts a spiral rotary motion to the gas flow in the laser tube.

BRIEF DESCRIPTION OF THE DRAWINGS

These and other objects, features, and advantages of the present invention will become more apparent from the following description of a preferred embodiment taken in conjunction with the accompanying drawings, in which:

FIG. 2 is a sectional drawing of the laser gas inflow section of an embodiment of the high-speed axial-flow gas laser generator of the present invention.

FIG. 3 is a sectional drawing viewed in the direction of the arrows III—III of FIG. 2.

DETAILED DESCRIPTION OF THE PREFERRED EMBODIMENTS

Figure 1:
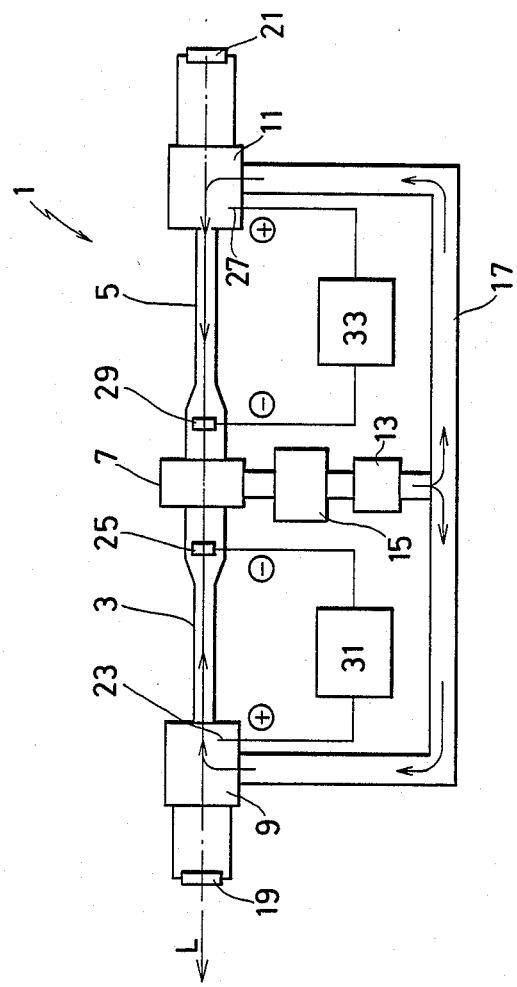
FIG. 1 is a simplified configuration diagram of an embodiment of the high-speed axial-flow gas laser generator of the present invention.

Now referring to FIG. 1, a high-speed axial-flow gas laser generator 1 comprises a pair of laser tubes 3, 5 which are provided in series next to the cathode side through a common gas discharge section 7. On the anode sides of the laser tubes 3, 5, a pair of gas inflow sections 9, 11 are provided. A gas circulating blower 13, a gas cooler 15, and a gas supply tube 17 are provided between the gas discharge section 7 and the gas inflow sections 9, 11. A laser beam output mirror 19 is provided at the left end of the gas inflow section 9, and a rear mirror 21 is provided at the right end of the gas inflow section 11. The laser beam is discharged in the direction of the arrow L. A high voltage power source 31 is provided between the anode 23 and the cathode 25. A high voltage power source 33 is provided between the anode 27 and the cathode 29.

There is provided a nozzle section in the present invention whereby the flow of the laser gas which inflows from the upstream anode receives a spiral rotary motion from the nozzle, and the flow of the laser gas has a uniform distribution over the entire area within the laser tube. Accordingly, stable plasma is produced throughout the entire area within the laser tube.

The details of the nozzle section of the gas inflow section 9 are shown in FIG. 2 and FIG. 3. (This also applies equally to the gas inflow section 11). As shown in FIG. 2, an inner nozzle 37 formed from insulating material and an outer nozzle 39 constructed from insulating material are combined and secured at one end surface of a gas supply tube 35 at the gas inflow section 9 by means of four bolts 41 with set pin holes in one face. An end section of a tube 43 which extends in the direction of the output mirror 19 is mounted on the inner nozzle 37 through an O-ring 45. One end section of the laser tube 3 is mounted on the outer nozzle 39 by means of a fixed member 49 and a bolt 51, through an O-ring 47.

Figure 4:
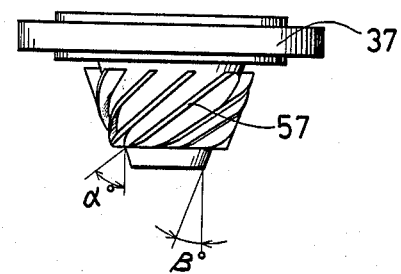
FIG. 4 is an explanatory drawing of the inner nozzle of an embodiment of the present invention.

A plurality of straightening orifices 53 are provided in the inner nozzle 37 as a straightening section to temporarily straighten the flow of the laser gas. A tip section 55 of the nozzle 37 is constructed of an insulating, heat resistant material such as a ceramic. On the cone shaped surface of the outer periphery of the inner nozzle 37, as shown in FIG. 4, a plurality of fins 57 which impart a rotary motion to the laser gas flow are provided with a uniform interval therebetween and inclined at a suitable angle (in this embodiment $\alpha$ degrees) with reference to the axial direction of the laser tube. Also, the angle between the cone shaped surface of the nozzle and the direction of the axis of the laser tube (hereinafter referred to as the nozzle angle) is $\beta$ degrees.

Figure 5:
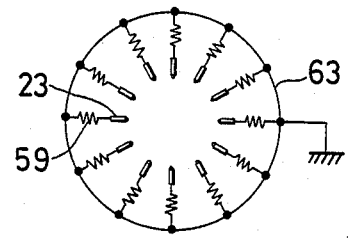
FIG. 5 is an explanatory drawing of the anode of an embodiment of the present invention.

Once again, referring to FIG. 2 and FIG. 3, a plurality of anodes 23 and a plurality of ballast resistances 59 are connected in series and are radially provided at regular intervals on the outer nozzle 39. An outer nozzle tip section 61, which is penetrated by the anode 23, is constructed from a insulating and heat resistant material, for example a ceramic, so that the discharge is concentrated at the anode 23 and so that it resists the high temperature. This nozzle angle is $\theta$ degrees. A grounded earth band 63 is provided on the outer perimeter of the outer nozzle 39. As shown in FIG. 5, one end of each ballast resistance 59 is connected radially. At the other end of each ballast resistance 59, as previously stated, there is connected one of the anodes 23 positioned radially.

Describing the shape of the anodes 23 more clearly than shown in FIG. 2, each anode 23 is provided with a T-shaped head section, and a mounting screw 67 connected to one end of the respective ballast resistance 59 contacts this head section through a conducting coil spring 65.

As a result of this configuration, the laser gas supplied in the direction of the arrow G in the gas inflow section 9 as shown in FIG. 2 is straightened through the straightening orifices 53 of the inner nozzle 37, and flows parallel to the axis in the axial direction. By means of a fin 57 between the inner nozzle 37 and the outer nozzle 39, a rotary motion flow having an angle of $\alpha$ degrees relative to the direction of the axis is imparted. This rotary motion flow contacts the anodes 23 which are positioned radially, and inflows to the laser tube 3 from the nozzle tip section 61 of the outer nozzle 39. The laser gas flowing into the laser tube 3, flows with a rotary motion inside the tube and, at the same time, flows uniformly so that the laser gas is distributed uniformly. The discharge is therefore uniformly produced and a uniform plasma is formed throughout the entire tube.

Figure 6:
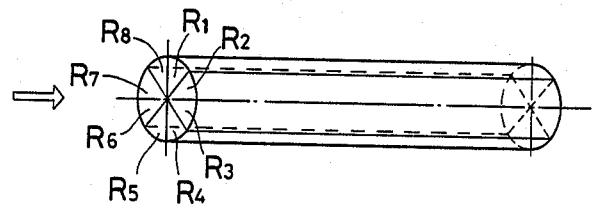
FIG. 6 and FIG. 7 are explanatory drawings of the gas flow within the laser tube of an embodiment of the present invention.
Figure 7:
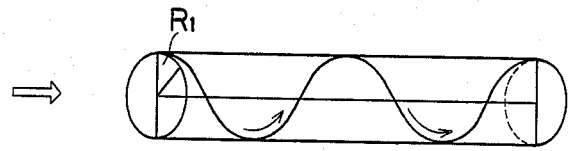

Specifically, as shown in FIG. 6, the cylindrical space of the discharge section between the anodes and the cathodes is partitioned into, for exammple, 8 parts, and the impedances are respectively designated as R1 to R8. Then, in the case where the laser gas flow (indicated by the arrow) does not have a rotary motion, if the impedance of one of the spaces, for example, R1, drops for some reason below that of the other spaces, the discharge, when produced, becomes concentrated in that one space and the generation of a uniform plasma is impossible. However, when a spiral-shaped rotary flow is imparted to the laser gas flow, as shown in FIG. 7, the impedance of each space becomes uniform and a uniform plasma distribution is obtained.

As can be understood from the foregoing explanation, because of the configuration herein described, a spiral-shaped rotary motion is imparted to the laser gas in the laser tube so that the entire region inside the tube becomes uniform, and it is possible to obtain a stable plasma over the entire region of the laser tube.

This embodiment of the present invention is given as an example only, but the present invention can appear in embodiments with other modes, and various modifications and changes can be made without departing from the scope of the present invention.

What is claimed is:

1. A high-speed axial-flow gas laser generator comprising:
    a laser tube means having a gas inflow means for supplying a laser gas into said laser tube means and a gas outflow means for discharging said laser gas out of said laser tube means, wherein a first hollow passageway is formed inside said gas inflow means;
    means for generating a spiral rotation motion in said laser gas through said laser tube means, said spiral rotation motion generating means being disposed within said first hollow passageway of said gas inflow section means;
    means for straightening said laser gas, said straightening means being provided within said first hollow passageway of said gas inflow means and disposed upstream from said spiral rotation motion generating means;
    pumping means for generating a population inversion in said laser gas; and
    optical resonator means for resonating radiation emitted from said population inversion to generate a laser beam.

2. A high-speed axial-flow gas laser generator as set forth in claim 1, wherein:
    said spiral rotation motion generating means comprises fins.

3. A high-speed axial-flow gas laser generator as set forth in claim 1, wherein:
    said straightening means comprises orifices formed therein.

4. A high-speed axial-flow gas laser generator as set forth in claim 2, wherein:
    said straightening means comprises orifices formed therein.

5. A high-speed axial-flow gas laser generator as set forth in claim 3, wherein:
    said optical resonator means comprises mirrors.

6. A high-speed axial-flow gas laser generator as set forth in claim 4, wherein:
    said optical resonator means comprises mirrors.

7. A high-speed axial-flow gas laser generator as set forth in claim 5, wherein:
    said pumping means comprises a plurality of anode pins symmetrically disposed within said laser tube means along radial lines with respect to the central axis of said laser tube, and further comprising a ring-shaped cathode disposed within said laser tube means at a spaced distance downstream from said anode pins.

8. A high-speed axial-flow gas laser generator as set forth in claim 6, wherein:
    said pumping means comprises a plurality of anode pins symmetrically disposed within said laser tube means along radial lines with respect to the central axis of said laser tube, and further comprising a ring-shaped cathode disposed within said laser tube means at a spaced distance downstream from said anode pins.

* * * * *